(12) United States Patent
Markus et al.

(10) Patent No.: US 9,208,190 B2
(45) Date of Patent: Dec. 8, 2015

(54) LOCK REORDERING FOR OPTIMISTIC LOCKING OF DATA ON A SINGLE NODE TO AVOID TRANSACTION DEADLOCK

(75) Inventors: Mircea Markus, London (GB); Manik Surtani, London (GB)

(73) Assignee: Red Hat, Inc., Raleigh, NC (US)

( * ) Notice: Subject to any disclaimer, the term of this patent is extended or adjusted under 35 U.S.C. 154(b) by 153 days.

(21) Appl. No.: 13/463,190

(22) Filed: May 3, 2012

(65) Prior Publication Data
US 2013/0297580 A1    Nov. 7, 2013

(51) Int. Cl.
*G06F 7/00* (2006.01)
*G06F 17/00* (2006.01)
*G06F 9/46* (2006.01)
*G06F 17/30* (2006.01)
*G06F 15/16* (2006.01)

(52) U.S. Cl.
CPC .......... *G06F 17/30351* (2013.01); *G06F 9/466* (2013.01); *G06F 17/30362* (2013.01); *G06F 17/30575* (2013.01)

(58) Field of Classification Search
CPC .................... G06F 17/30362; G06F 17/30575; G06F 9/466
USPC .................................. 707/703, 615; 718/101
See application file for complete search history.

(56) References Cited

U.S. PATENT DOCUMENTS

| 8,301,700 | B1 * | 10/2012 | Havemose ..................... 709/205 |
| 2007/0043703 | A1 * | 2/2007 | Bhattacharya et al. 707/999.003 |
| 2009/0217274 | A1 * | 8/2009 | Corbin et al. ................. 718/101 |
| 2009/0287703 | A1 * | 11/2009 | Furuya ................... 707/999.008 |
| 2009/0313311 | A1 * | 12/2009 | Hoffmann et al. ...... 707/999.204 |
| 2011/0016348 | A1 * | 1/2011 | Pace et al. ......................... 714/2 |

OTHER PUBLICATIONS

Randy Chow and Theodore Johnson. Distributed Operating Systems and Algorithms. Addison-Wesley, Reading, Massachusetts, USA, 1997, Title Pages, Preface, Section 4.3, 6.3 and 12.1, pp. ii, iii, vii-xii, 123-127, 207-218 and 425-452.*

* cited by examiner

Primary Examiner — Usmaan Saeed
Assistant Examiner — Brian E. Weinrich
(74) Attorney, Agent, or Firm — Lowenstein Sandler LLP

(57) ABSTRACT

A node a data grid receives a prepare request identifying data to lock for a first transaction. The prepare request indicates a locking order that is different from a locking order indicated by a prior prepare request of a second transaction using the same data. The node identifies keys that correspond to the data. The keys are co-located on the node. The node ranks the keys to define an order for acquiring locks for the data based on key identifiers that correspond to the keys. The defined order matches a locking order used by the second transaction. The node acquires locks for the data using the defined order.

13 Claims, 5 Drawing Sheets

LOCK REORDERING FOR OPTIMISTIC LOCKING OF DATA ON A SINGLE NODE TO AVOID TRANSACTION DEADLOCK

TECHNICAL FIELD

Embodiments of the present invention relate to transaction deadlock, and more particularly, to lock reordering for optimistic locking of data on a single node to avoid transaction deadlock.

BACKGROUND

The XA (eXtended Architecture) protocol relates to transactions that consist of multiple operations that access resources. For example, a banking application may conduct an XA transaction that consists of two operations (1) deduct money from a first bank account and (2) add money to a second bank account. Typically, either both of the operations relating to the XA transaction will be permanent, if successful, or none of them will be committed.

In traditional data storage systems, consistency is usually achieved by a data locking mechanism to prevent data from being corrupted or invalidated when multiple users try to write to the same data. When a lock of the data is acquired for a transaction, the transaction has access to the locked data until the lock is released. Other transactions may not have access to the locked data. The XA standard uses a two-phase commit (2PC) protocol to ensure that all resources enlisted within a transaction either commit or rollback to a previous state. The first phase is preparation, which may include acquiring a lock on the data for the transaction to prevent other transactions from accessing that data, and updating the values (e.g., deduct money, add money) for the locked data to reflect the transaction. If preparation is successful, the second phase of commitment can be initiated, which may include releasing the locks to allow other transactions access to the data that was updated. A pessimistic locking approach typically acquires locks with each write operation of a transaction. For example, a lock may be acquired when the first bank account balance is changed and a lock may be acquired when the second account balance is changed. In an optimistic locking approach, locks are usually not acquired until during the prepare phase.

A deadlock may occur when two transactions that write to the same data execute concurrently or execute nearly at the same time. A deadlock is a situation wherein two or more competing actions are each waiting for the other to finish, and thus, neither transaction finishes. For example, a first transaction (TX1) wishes to acquire locks on Data-A and Data-B in that order. A second transaction (TX2) wishes to acquire locks on Data-B and Data-A in that order. If the transactions run in parallel, TX1 may obtain a lock on Data-A, and TX2 may obtain a lock on Data-B. TX1 would like to progress and acquire a lock on Data-B, but would not be able to do so since Data-B is already locked by TX2. Similarly, TX2 would try to acquire a lock on Data-A, but would not be able to do so since Data-A is already locked by TX1. Each transaction waits for the other transaction to finish causing a deadlock.

Traditional solutions typically wait for a deadlock to occur and then build a dependency graph describing the dependencies between the deadlocked transactions. Generally, conventional solutions terminate one of the two deadlocked transactions. Such traditional solutions may be quite costly because they involve a large amount of CPU and network usage, which is not ideal. Such solutions are generally also not fast enough in terminating a deadlocked transaction.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
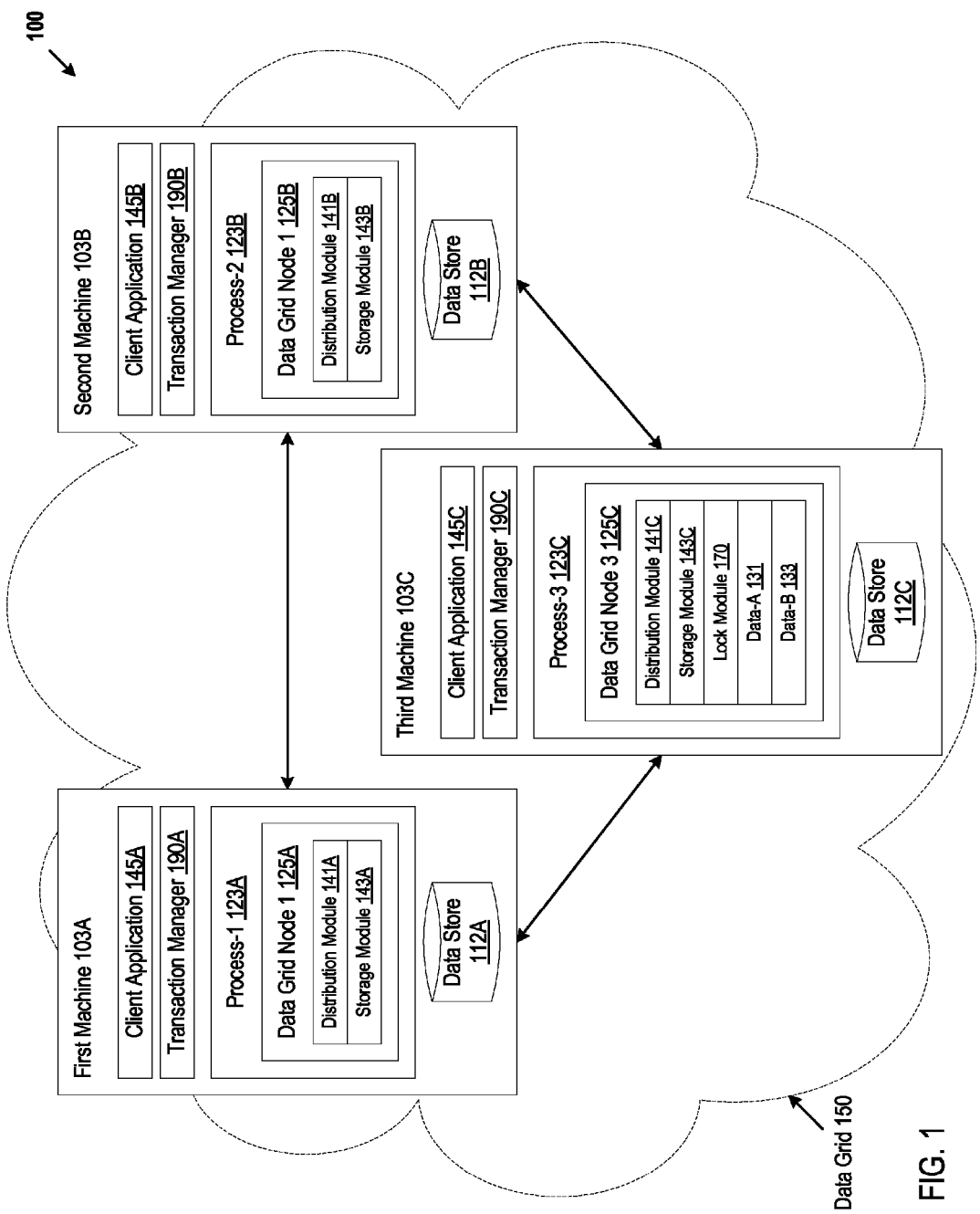
FIG. 1 illustrates exemplary network architecture, in accordance with various embodiments of the present invention.

Described herein are a method and apparatus for lock reordering for optimistic locking of data on a single node to avoid transaction deadlock. A data grid has multiple operating system processes. A process can run a data grid node, which is an instance of a data grid application. A process "owning" transaction data for a transaction hereinafter refers to a process that has a capability to perform prepare operations (e.g., acquire data locks, update values) for the transaction. A process that owns transaction data for a transaction is hereinafter referred to as an "enlisted process." A node running in an enlisted process is hereinafter referred to as an "enlisted node." A process that manages a transaction is hereinafter referred to as a "transaction originator process." A node running in a transaction originator process is hereinafter referred to as a "transaction originator node." Transaction data for the transaction may not be owned by the transaction originator node and the transaction originator node can communicate with the enlisted node which owns the transaction data for a transaction.

The data that is owned by an enlisted node can be used by multiple transactions. An enlisted node can receive prepare requests from transaction originator nodes, concurrently or nearly at the same time, to prepare the same data for a commit operation, but for different transactions. For example, a first transaction involves two operations: (1) deduct money from the balance for a first bank account and (2) add the deducted money to the balance of the second bank account. A second transaction involves two operations using the same data, but in an order different from the first transaction, such as (1) deduct money from the balance for the second bank account and (2) add the deducted money to the balance of the first bank account. The enlisted node may own data for the first bank account and the second bank account and may receive prepare requests from the transaction originator nodes for the first transaction and the second transaction, concurrently or nearly at the same time, to prepare the same data (e.g., balance for first bank account, balance for second bank account) for a commit operation, but for the two different transactions.

To avoid transaction deadlock, in one embodiment, the enlisted node executing in a computer system in a data grid receives a prepare request identifying data to lock for a transaction and identifies the keys that correspond to the data. The keys are co-located on the enlisted node. The enlisted node ranks the keys to define an order for acquiring locks for the data based on key identifiers that correspond to the keys and acquires locks for the data using the defined order. The enlisted node can define an order for acquiring locks for each prepare request.

Embodiments avoid deadlocks by ensuring that transactions attempting to lock the same data use identical order for obtaining locks on that data. For example, if the enlisted node determine that the lock order for the first transaction is to first lock the balance of the first bank account and then to lock the balance of the second bank account, the enlisted node ensures that the lock order for the second transaction is also to first lock the balance of the first bank account and then to lock the balance of the second bank account, which is the same order as the first transaction, thus avoiding deadlock.

FIG. 1 is an exemplary network architecture 100 in which embodiments of the present invention can be implemented. The network architecture 100 can include multiple machines 103,105, 107 connected via a network (not shown). The network may be a public network (e.g., Internet), a private network (e.g., a local area network (LAN)), or a combination thereof.

The machines 103,105,107 may be configured to form a data grid 150. Data grids are an alternative to databases. A data grid 150 distributes data across multiple operating system processes. The operating system processes can run an instance of a data grid application and can use a distribution algorithm to determine which processes in the data grid 150 have the data for a transaction. Each process can own data and allow other processes access to the data. Unlike a database, the distributed data of a data grid 150 removes single points of failure.

FIG. 1 is an exemplary network architecture 100 in which embodiments of the present invention can be implemented. The network architecture 100 can include multiple machines, including a first machine 103A, a second machine 103B, and a third machine 103C, connected via a network (not shown). The network may be a public network (e.g., Internet), a private network (e.g., a local area network (LAN)), or a combination thereof.

The machines 103A-103C may be configured to form a data grid 150. Data grids are an alternative to databases. A data grid 150 distributes data across multiple operating system processes. The operating system processes can run an instance of a data grid application and can use a distribution algorithm to determine which processes in the data grid 150 have the data for a transaction. Each process can own data and allow other processes access to the data. Unlike a database, the distributed data of a data grid 150 removes single points of failure.

The machines 103A-103C may be hardware machines such as desktop computers, laptop computers, servers, or other computing devices. Each of the machines 103A-103C may include an operating system that manages an allocation of resources of the computing device. In one embodiment, one or more of the machines 103A-103C is a virtual machine. For example, one or more of the machines may be a virtual machine provided by a cloud provider. In some instances, some machines may be virtual machines running on the same computing device (e.g., sharing the same underlying hardware resources). In one embodiment, one or more of the machines 103A-103C is a Java® Virtual Machine (JVM), which may run on a hardware machine or on another virtual machine.

The machines 103A-103C each include one or more processes, including a first process 123A, a second process 123B, and a third process 123C. Each process 123A-123C is an operating system process (e.g., a Java® Virtual Machine instance). Each process 123A-125C can run a data grid node (also hereinafter referred to a "node") 125A-125C, which is an instance of a data grid application. Each process 123A-123C runs one of the data grid nodes 125A-125C. For example, the first process 123A runs a first data grid node 125A. Each machine 103A-103C can run more than one process and a corresponding data grid node.

Each data grid node 125A-125C may act as a server to clients and as a peer to other data grid nodes 125A-125C. An in-memory data grid may rely on main memory for data storage. In-memory data grids are faster than disk-optimized data grids since disk interactions are generally much slower than in-memory interactions. For brevity and simplicity, an in-memory data grid is used as an example of a data grid throughout this document.

In one embodiment, the in-memory data grid 150 operates in a client-server mode, in which the in-memory data grid 150 serves resources (e.g., a stateful data store such as a cache) to client applications. In one embodiment, each machine 103A-103C is a client machine hosting one or more applications 145A-145C. Each of the applications 145A-145C can be any type of application including, for example, a web application, a desktop application, a browser application, etc. each of the applications 145A-145C can be hosted by one or more of the machines 103A-103C. In one embodiment, the in-memory data grid 150 acts as a shared storage tier for the applications 145A-145C. A separate memory space may be generated for each of the applications 145A-145C. In one embodiment, a client application runs outside of the virtual machines (e.g., the machines 103A-103C) of the data grid nodes 125A-125C. In another embodiment, a client application runs in the same virtual machine as a data grid node 125A-125C. In another embodiment, a client application may not be a Java®-based application and may not be executed by a Java® Virtual Machine.

Each of the processes 123A-123C in the in-memory data grid 150 may execute data operations, such as to store objects, to retrieve objects, to perform searches on objects, etc. Unlike a database, the in-memory data grid 150 distributes stored data across multiple data stores 112A-112C (e.g., cache-nodes, grid-nodes) of the multiple processes 123A-123C. The in-memory data grid 150 can include a volatile in-memory data structure such as a distributed cache. Each of the processes 123A-123C can maintain a respective data store 112A-112C (e.g., cache-node, grid-node). In one embodiment, the data grid 150 is a key-value based storage system to host the data for the in-memory data grid 150 in the data stores 112A-112C.

The key-value based storage system (e.g., data grid 150) can hold and distribute data objects based on a distribution algorithm (e.g., a consistent hash function). For example, the in-memory data grid 150 may store bank account objects with a key-value model of (accountNumber, accountObject). The data grid 150 can store a particular key-value pair by using a distribution algorithm to determine which of the processes 123A-123C stores the particular value for the key-value pair and then place the particular value within that process. Each of the processes 123A-123C of the data grid 150 can use the distribution algorithm to allow key look up.

When one of the client applications 145A-145C is writing data to the data grid 150, the client application can connect to any of the processes 123A-123C in the data grid 150 and provide the key-value pair (e.g., accountNumber, BankAccount instance) to the process. Each of the processes 123A-123C can include a respective distribution module 141A-

141C to determine, based on the key (i.e., accountNumber) and a distribution algorithm, which node in the data grid 150 is the enlisted node where the data (e.g., key-value pair) is to be stored. Each of the distribution modules 141A-141C may then send the key-value pair to the enlisted node via the network. Each data grid node 125A-125C can include a respective data storage module 143A-143C to store the key-value pair in its corresponding data store 112A-112C.

For example, one of the client applications 145A-145C may connect to transaction originator node 1 (125A) and passes a key-value pair for Data-A (131) and a key-value pair for Data-B (133) to the transaction originator node 1 (125A) to add data to the data grid 150. The distribution module 141A of the transaction originator node 1 (125A) uses the keys in the received key-value pairs and a distribution algorithm to identify that node 3 (125C) is the enlisted process that owns the Data-A (131) and Data-B (133) for the keys. The distribution module 141A of the transaction originator node 1 (125A) may then send the key-value pairs to the enlisted node 3 (125C) via the network. Upon receiving the key-value pairs, the storage module 143C in the enlisted node 3 (125C) may store the key-value pair for Data-A (131) and the key-value pair for Data-B (133) in its data store 116.

The data grid 150 can support multi-operational transactional access of the processes 123A-123C and the corresponding data stores 112A-112C. A multi-operational transaction can be an XA (eXtended Architecture) transaction. For brevity and simplicity, an XA transaction is used as an example of a multi-operational transaction throughout this document. In the XA architecture, an XA transaction is a distributed transaction that consists of multiple operations that access one or more resources. Examples of transaction operations for a XA transaction can include, and are not limited to, start, read, write, prepare, commit, rollback, and recover operations. Performing operations that pertain to multi-operational transactional access on data in the in-memory data grid 150 may be performed by calling a get, put, remove, replace, start, prepare, commit, rollback, and recover functions on one or more processes of the in-memory data grid 150.

One of the client applications 145A-145C can initiate a transaction having multiple operations (e.g., reduce balance, increase balance) by communicating a start of a transaction to a respective transaction manager 190A-190C. Each of the transactions managers 190A-190C communicates with a corresponding one of the client applications 145A-145C and with the various processes 123A-123C in the data grid 150 to manage the transaction. In one embodiment, each of the processes 123A-123C includes a corresponding transaction manager 190A-190C to allow each of the client applications 145A-145C to initiate a transaction with any of the processes 123A-123C in the data grid 150.

The operations that pertain to an XA transaction are considered to be within the scope of an XA transaction. Data consistency in the data grid 150 can be by a data locking mechanism to prevent data from being corrupted or invalidated when multiple users try to write to the same data. When a lock of the data is acquired for a transaction, the transaction has access to the locked data until the lock is released. Other transactions may not have access to the locked data. The XA standard uses a two-phase commit (2PC) protocol to ensure that all resources enlisted within a transaction either commit or rollback to a previous state. The first phase is preparation, which may include acquiring a lock on the data for the transaction to prevent other transactions from accessing that data, and updating the values (e.g., deduct money, add money) for the locked data to reflect the transaction. If preparation is successful, the second phase of commitment can be initiated in the data grid 150, which may include releasing the locks to allow other transactions access to the data that was updated. For example, a banking application (e.g., one of the client applications 145A-145C) may wish to conduct a transaction that consists of two operations: (1) deduct money from the first bank account, and (2) add the deducted money to a second bank account. Before any of the write operations are committed to the data grid 150, the success of performing of each write operation is first determined.

Transaction originator nodes and enlisted nodes in the data grid 150 can use optimistic locking to ensure that either all of the operations for a transaction successfully happen or none of them are committed. In an optimistic locking approach, locks are usually not acquired until during the prepare phase.

A deadlock may occur when two transactions that write to the same data execute concurrently or nearly at the same time. To avoid deadlock, the enlisted nodes (e.g., node 3 125C) in the data grid 150 can include a lock module 170 to create and use the same order for acquiring data locks for the multiple transactions that use the same data to avoid a deadlock between the multiple transactions. Embodiments of using the same order for acquiring data locks for multiple transactions which use the same data is described in greater detail below in conjunction with FIG. 3 and FIG. 4.

Figure 2:
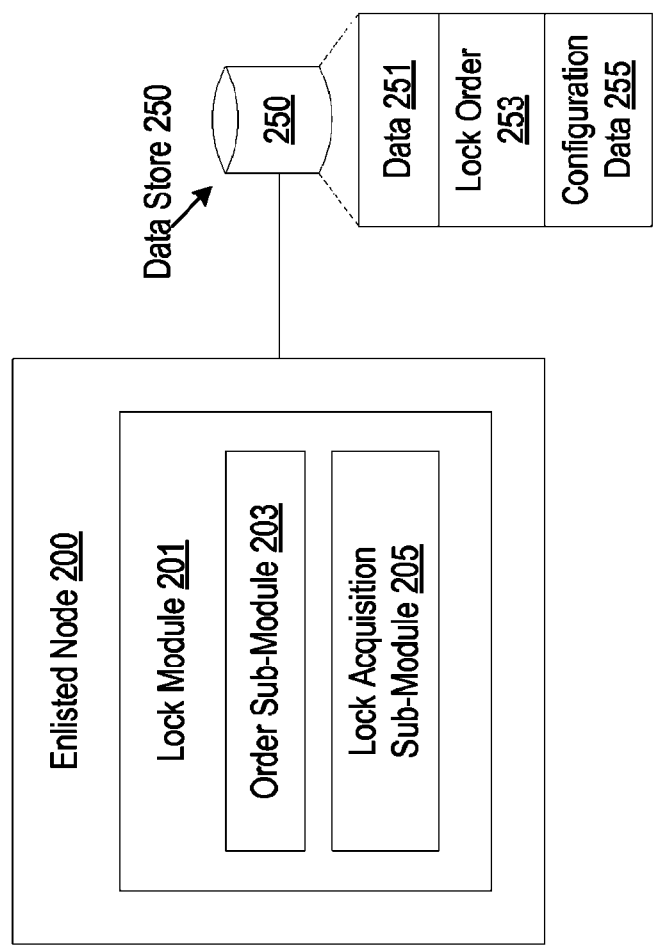
FIG. 2 is a block diagram of an embodiment of a lock module in an enlisted node.

FIG. 2 illustrates a block diagram of one embodiment of a lock module 201 in an enlisted node 200. The enlisted node 200 may correspond to enlisted process 123C and data grid node 125C running in machine 107 of FIG. 1. The enlisted node 200 includes a lock module 201. The lock module 201 can include an order sub-module 203 and a lock acquisition sub-module 205.

The data store 250 is coupled to the enlisted node 200 and can store data 251 for that is used by multiple transactions. The data 251 is data that is owned and maintained by the enlisted node 200. The data store 250 can be a cache. The data 251 can include key-value pairs. The data 251 can be used by multiple transactions concurrently or nearly at the same time. For example, the data 251 includes Data-A and Data-B. Data-A may be a balance for Bank-Account-A and Data-B may be a balance for Bank-Account-B. Data-A and Data-B may be used by two transactions TX1 and TX2. TX1 may involve deducting money from Data-A and adding the deducted money to Data-B. Nearly the same time TX1 is executing, TX2 may involve deducting money from Data-B and adding the deducted money to Data-A.

The enlisted node 200 can receive prepare requests from any number of transaction originator nodes to prepare multiple operations for any number of transactions for a commit. For example, the enlisted node 200 can receive a prepare request from a first transaction originator node for TX1 and may concurrently or nearly at the same time receive a prepare request from a second transaction originator node for TX2. The prepare request can be a network call (e.g., remote procedure call (RPC)). A prepare request can include keys and a new value for each key. A prepare request can be a request to acquire a lock on the transaction data 251 for the requested keys and to update the values associated with the keys using the new values in the prepare request.

The order sub-module 201 can create an order to lock the data 251 for the transaction. The order sub-module 201 can use key identifiers that correspond to the keys in the prepare request to create the lock order. The order sub-module 201 can store the lock order 253 in the data store 250. The order sub-module 201 can create the lock order 253 by determining a hash value for each of the keys using the corresponding key identifiers and can rank the keys based on the hash values. The order sub-module 201 can use a non-cryptographic hash function. In one embodiment, the order sub-module 201 uses a MurmurHash function. One embodiment of creating an order to lock the data for the transaction is described in greater detail below in conjunction with FIG. 4.

The lock acquisition sub-module 205 can acquire a lock on the data 251 based on the lock order 253. One embodiment of acquiring locks using the created lock order is described in greater detail below in conjunction with FIG. 3 and FIG. 4. If the data 251 is currently locked, the lock acquisition sub-module 205 can wait until the existing lock on the key is released. In one embodiment, the lock acquisition sub-module 205 uses a timeout period to determine how long to wait. The timeout period can be stored in configuration data 255 in the data store 250. When a lock is acquired, the lock acquisition sub-module 205 can update the current value for a key in the data 251 based on the new value received in the prepare request. The lock-acquisition sub-module 205 can send a message to the transaction originator node indicating whether the locks on the requested keys in the data 251 were successful or not.

The enlisted node 200 can receive commit requests from any number of transaction originator nodes to commit the prepared operations. The commit request can include a request to release the locks on the locked data 251 to allow other transactions access to the updates made to the data 251. The lock acquisition sub-module 205 can release the locks on the locked data 251.

Figure 3:
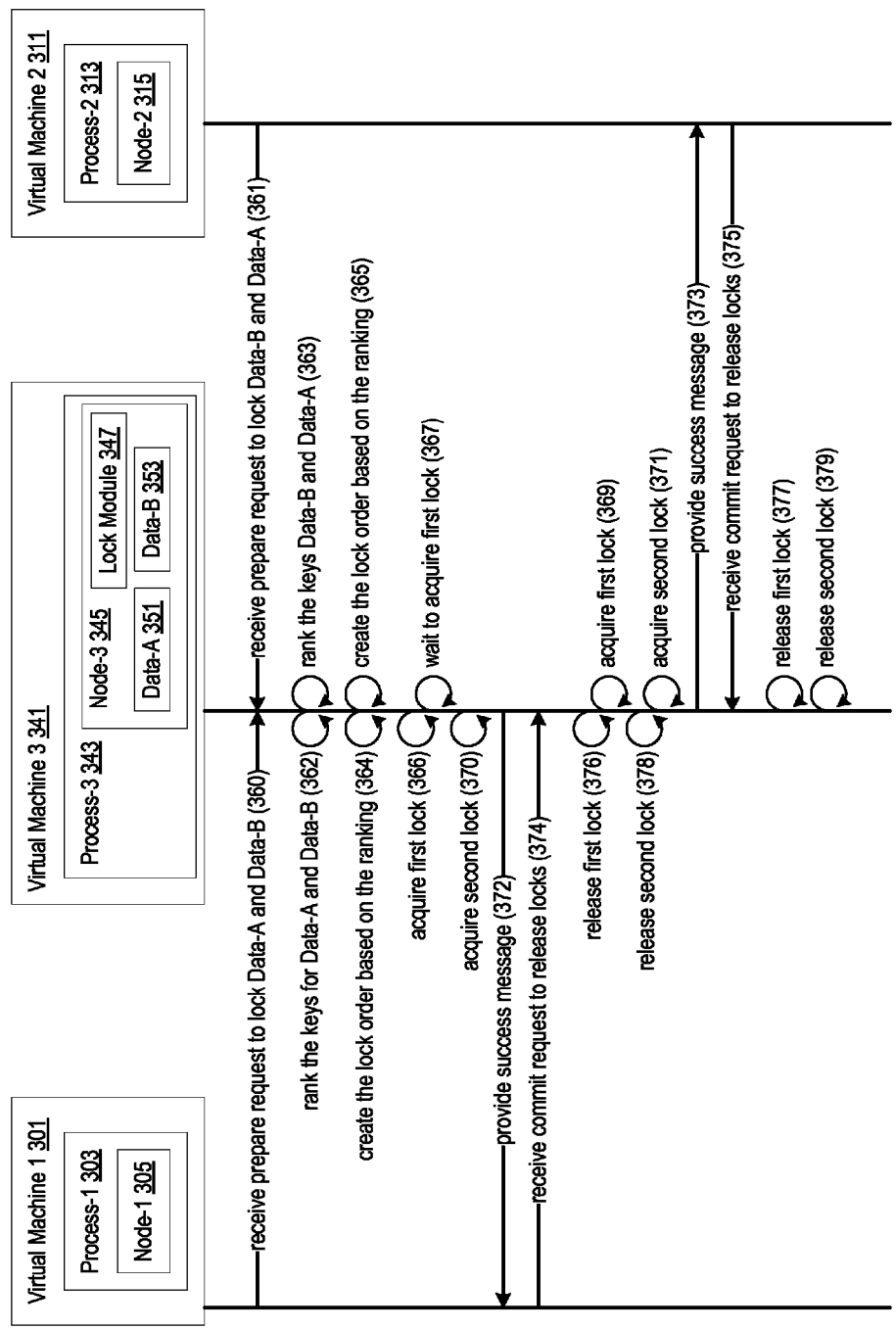
FIG. 3 is a block diagram of one embodiment of lock reordering for optimistic locking of data on a single node to avoid transaction deadlock.

FIG. 3 is a block diagram of one embodiment of lock reordering for optimistic locking of data on a single node to avoid transaction deadlock. A first virtual machine 301 can include a client application (not shown), a transaction manager (not shown), and Process-1 303 running a transaction originator node Node-1 303 that is managing a first transaction Transaction-1 (TX1). A second virtual machine 311 can include a client application (not shown), a transaction manager (not shown), and Process-2 313 running a transaction originator node Node-2 315 that is managing a second transaction Transaction-2 (TX2).

A third virtual machine 341 can include Process-3 343 running an enlisted node Node-3 345 that controls transaction data for two transactions (e.g., TX1, TX2). Node-3 345 can own transaction data, Data-A 351 and Data-B 353. The transaction data (e.g., Data-A, Data-B) includes keys and values for the keys. Node-3 345 can include a lock module 347 (e.g., lock module 201 in FIG. 2) to create the same order for acquiring the locks on the data for the multiple transactions that use the same data.

The enlisted Node-3 345 receives (360) a prepare request from Node-1 305 to prepare Data-A and Data-B for TX1 for a commit. The prepare request can include a new value for Data-A and Data-B. The prepare request may be for Node-3 345 to first lock Data-A and change the value corresponding to Data-A and then to lock Data-B next and to change the value corresponding to Data-B.

Nearly at the same time, the enlisted Node-3 345 receives (361) a prepare request from Node-2 311 to prepare the Data-B and Data-A for TX2 for a commit. The prepare request can include a new value for Data-B and Data-A. The prepare request may be for Node-3 345 to first lock Data-B and change the value corresponding to Data-B and then to lock Data-A next and to change the value corresponding to Data-A.

To prevent a transaction deadlock, the lock module 347 ranks (362) the keys for Data-A and Data-B for TX1 and ranks (363) the keys for Data-B and Data-A for TX2. For each transaction (e.g., TX1, TX2) the lock module 347 can identify the key identifier for each of Data-A and Data-B and can run a consistent hash function on the key identifiers to create hash values that correspond to Data-A and Data-B. The lock module can create (364,365) the lock order to lock the data (e.g., Data-A and Data-B) based on the hash values. For example, the lock module 347 may compare the hash values and identify which hash value is the least hash value and position the data corresponding to the least hash value in a first position in the lock order. For example, the lock order is to lock Data-A first and then to lock Data-B next. The lock order is the same for both TX1 and TX2 since the transactions use the same data.

The created lock order may be an order that is different than an order of executing the operations for a transaction. For example, the operations for TX2 may have been executed as writing to Data-B first and then writing to Data-A next, and the order for locking the data for TX2 may be locking Data-A first and then locking Data-B next.

The lock module 347 may acquire (366) a lock on Data-A for TX1 and changes the value of Data-A using the value received in the prepare request from Node-1 305. The lock module 347 attempts to acquire a lock on Data-A for TX2, but since Data-A is already locked for TX1, the lock module 347 waits (367) until the lock is released to acquire a lock on Data-A for TX2. The lock module 347 may continue with the lock order and acquire (370) the lock on Data-B for TX1. The lock module 347 changes the value of Data-B using the value received in the prepare request from Node-1 305. The lock module 347 provides (372) a success message to Node-1 305.

The lock module 347 receives (374) a commit request to release the locks for the lock data from Node-1 305. A commit operation is to make a set of changes that were made by the prepare operations to one or more caches for a particular XA transaction permanent. A commit transaction request can be a request to release the locks to allow other transactions access to the data that was updated. The lock module 347 releases (375) the lock on Data-A and releases (378) the lock on Data-B for TX1.

Since the lock on Data-A is released, the lock module 347 acquires (369) the lock on Data-A for TX2 and changes the value of Data-A using the value received in the prepare request from Node-2 315. The lock module 347 may continue with the lock order and acquire (371) the lock on Data-B for TX2. The lock module 347 changes the value of Data-B using the value received in the prepare request from Node-2 315. The lock module 347 provides (373) a success message to Node-2 315. The lock module 347 receives (375) a commit request to release the locks for the lock data from Node-2 315 and releases (377) the lock on Data-A and releases (379) the lock on Data-B for TX2.

Figure 4:
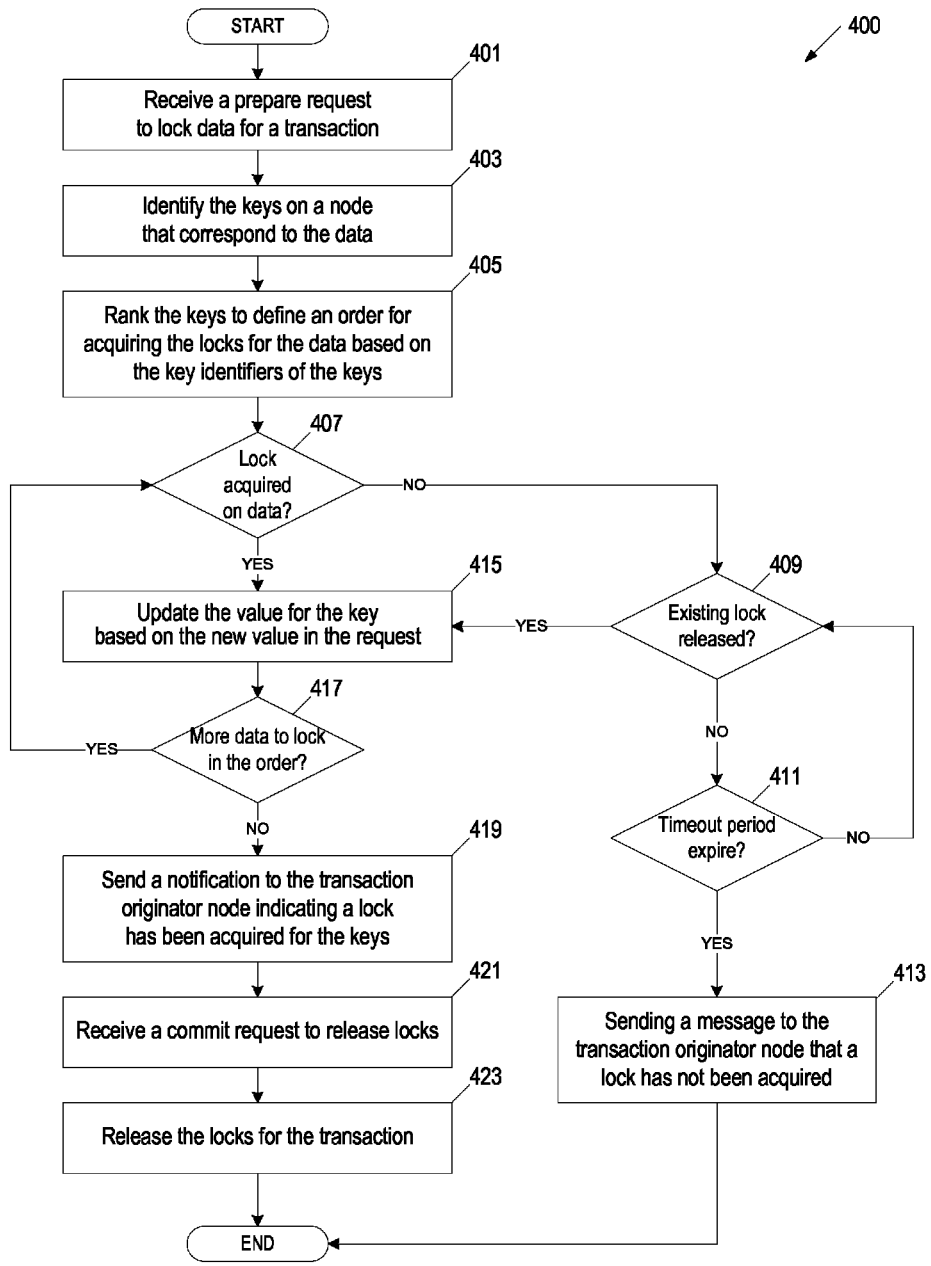
FIG. 4 is a flow diagram illustrating an embodiment for a method of lock reordering for optimistic locking of data on a single node to avoid transaction deadlock.

FIG. 4 is a flow diagram of an embodiment of a method 400 of an enlisted node providing lock reordering for optimistic locking of data on a single node to avoid transaction deadlock. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by an enlisted node 125C executing in a machine 107 of FIG. 1.

At block 401, processing logic receives a prepare request from a transaction originator node to lock data for multiple operations of a transaction. Processing logic can receive the prepare request via a network call over the network. The transaction can be an XA transaction. Processing logic may receive another prepare request from a different transaction originator node for a different transaction that uses the same data during the execution of method 400 and may execute another instance of method 400 in parallel.

At block 403, processing logic identifies the keys that correspond to the data that is to be locked. The keys are co-located on the enlisted node. Processing logic can examine the prepare request which includes the keys that should be locked and the corresponding new value for each key. The keys that should be locked correspond to keys related to write operations.

At block 405, processing logic ranks the keys to define an order for acquiring locks for the data based on the key identifiers that correspond to the keys. Processing logic can determine a hash value for each of the keys using the corresponding key identifiers and can rank the keys based on the hash values. In one embodiment, processing logic orders the hash values from a least hash value to a greatest hash value and positions the keys in the order that corresponds to the least hash value to the greatest hash value. In another embodiment, processing logic orders the hash values from a greatest hash value to a least hash value and positions the keys in the order that corresponds to the greatest hash value to the least hash value. Processing logic can use a non-cryptographic hash function. In one embodiment, processing logic uses a MurmurHash function. The defined order may be an order that is different than an order of executing the operations for the transaction.

At block 407, processing logic attempts to acquire a lock on the data based on the defined order. If a lock is not acquired (block 407), for example, because there is an existing lock on the key by another transaction, processing logic waits until the existing lock on the key is released at block 409. If the existing lock is not released (block 409), processing logic determines whether a timeout period has expired at block 411. If the timeout period has not expired (block 411), processing logic continues to wait until the existing lock on the key is released at block 409. If the timeout period has expired (block 411), processing logic sends a message to the transaction originator node indicating a lock has not been acquired at block 413.

If a lock is acquired (block 407) or if the existing lock on the key is released (block 409), processing logic updates the current value for the key based on the new value received in the request at block 415. At block 417, processing logic determines whether there is more data to lock for the transaction in the defined order. If there is more data to lock (block 413), processing logic attempts to acquire a lock on the data based on the defined order at block 407. If there is no more data to lock (block 413), processing logic sends a notification to the transaction originator node indicating a lock has been acquired for the keys pertaining to the transaction at block 419. At block 421, processing logic receives a commit request to release the locks on the locked data. At block 423, processing logic releases the locks to allow other transactions access to the data.

Figure 5:
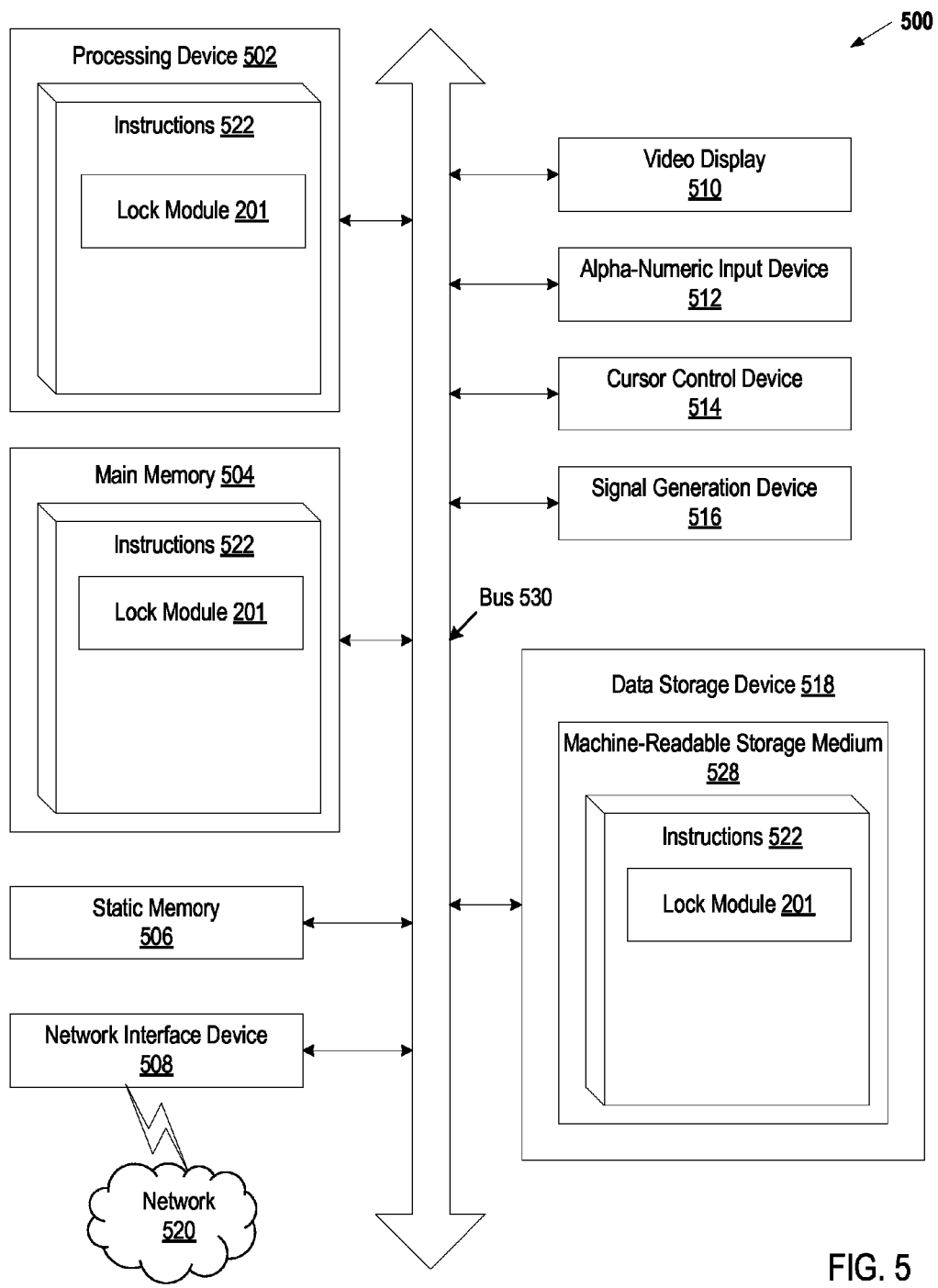
FIG. 5 is a block diagram of an exemplary computer system that may perform one or more of the operations described herein.

FIG. 5 illustrates a representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one embodiment, the instructions 522 include instructions for a lock module (e.g., lock module 201 of FIG. 2) and/or a software library containing methods that call modules in a lock module. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "identifying" or "performing" or "determining" or "sending" or "comparing" or "storing" or "locating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
    receiving, by a processing device, a first prepare request identifying data to lock for a first transaction, the first prepare request indicating a first locking order that is different from a second locking order indicated by a second prepare request identifying the data to lock for a second transaction;
    ranking, by the processing device, a plurality of keys associated with the data to define a third locking order used to lock the data for the first transaction and the second transaction, wherein ranking the plurality of keys comprises:
        identifying a key identifier for each key of the plurality of keys, the key identifier comprising a key-value pair indicating a data node location for a corresponding key,
        determining a hash value for each key of the plurality of keys,
        ordering the hash values from a least hash value to a greatest hash value or from a greatest hash value to a least hash value, and
        ordering the plurality of keys in view of ordering the hash values; and
    acquiring locks for the data for the first transaction or the second transaction using the third locking order, wherein acquiring the locks for the data comprises updating the respective key identifier for each of the plurality of keys associated with the third locking order in view of a corresponding hash value.

2. The method of claim 1, further comprising:
    receiving a third prepare request identifying the data to lock for a third transaction;
    releasing the locks for the data for the first transaction or the second transaction; and
    acquiring locks for the data for the third transaction using the third locking order.

3. The method of claim 1, wherein the third locking order is different than an execution order of executing a plurality of operations for the first transaction and the second transaction.

4. The method of claim 1, wherein determining the hash value for each of the plurality of keys comprises using a non-cryptographic hash function.

5. The method of claim 1, wherein the first transaction and the second transaction are multi-operation transactions.

6. The method of claim 1, wherein the plurality of keys are co-located on a node comprising the processing device.

7. A non-transitory computer-readable medium including instructions that, when executed by a processing device, cause the processing device to:
    receive, by the processing device, a first prepare request identifying data to lock for a first transaction, the first prepare request indicating a first locking order that is different from a second locking order indicated by a second prepare request identifying the data for a second transaction;
    rank a plurality of keys associated with the data to define a third locking order used to lock the data for the first transaction and the second transaction, wherein to rank the plurality of keys comprises the processing device to:

identify a key identifier for each key of the plurality of keys, the key identifier comprising a key-value pair indicating a data node location for a corresponding key, determine a hash value for each key of the plurality of keys, order the hash values from a least hash value to a greatest hash value or from a greatest hash value to a least hash value, and order the plurality of keys in view of ordering the hash values; and acquire locks for the data for the first transaction or the second transaction using the third locking order, wherein to acquire the locks for the data further comprises the processing device to update the respective key identifier for each of the plurality of keys associated with the third locking order in view of a corresponding hash value.

8. The non-transitory computer-readable medium of claim 7, the processing device further to:

receive a third prepare request identifying the data to lock for a third transaction;

release the locks for the data for the first transaction or the second transaction; and acquire locks for the data for the third transaction using the third locking order.

9. The non-transitory computer-readable medium of claim 7, wherein the third locking order is different than an execution order of executing a plurality of operations for the first transaction and the second transaction.

10. The non-transitory computer-readable medium of claim 7, wherein to determine the hash value for each of the plurality of keys, the processing device is to use a non-cryptographic hash function.

11. A system comprising:

a memory; and a processing device operatively coupled to the memory, the processing device to:

receive a first prepare request identifying data to lock for a first transaction, the first prepare request indicating a first locking order that is different from a second locking order indicated by a second prepare request identifying the data to lock for a second transaction;

rank a plurality of keys associated with the data to define a third locking order, the third locking order used to lock the data for the first transaction and the second transaction, wherein to rank the plurality of keys the processing device is to:

identify a key identifier for each key of the plurality of keys, the key identifier comprising a key-value pair indicating a data node location for a corresponding key, determine a hash value for each key of the plurality of keys, order the hash values from a least hash value to a greatest hash value or from a greatest hash value to a least hash value, and order the plurality of keys in view of ordering the hash values; and acquire locks for the data for the first transaction or the second transaction using the third locking order, wherein to acquire the locks for the data further comprises the processing device to update the respective key identifier for each of the plurality of keys associated with the third locking order in view of a corresponding hash value.

12. The system of claim 11, wherein the processing device is further to:

receive a third prepare request identifying the data to lock for a third transaction;

release the locks for the data for the first transaction or the second transaction; and acquire locks for the data for the third transaction using the third locking order.

13. The system of claim 11, wherein the third locking order is different than an execution order of executing a plurality of operations for the first transaction and the second transaction.

* * * * *